(12) United States Patent
Greco et al.

(10) Patent No.: US 8,775,565 B2
(45) Date of Patent: Jul. 8, 2014

(54) SYSTEMS AND METHODS FOR PROVIDING ELECTRONIC DOCUMENT SERVICES

(75) Inventors: Paul V. Greco, New Rochelle, NY (US); Ryder Daniels, New York, NY (US); Donald T. Beldock, Rye, NY (US); Mario A. Aieta, New York, NY (US)

(73) Assignee: Intellectual Ventures Fund 3, LLC, Las Vegas, NV (US)

( * ) Notice: Subject to any disclaimer, the term of this patent is extended or adjusted under 35 U.S.C. 154(b) by 1876 days.

(21) Appl. No.: 10/876,766

(22) Filed: Jun. 28, 2004

(65) Prior Publication Data

US 2005/0119998 A1    Jun. 2, 2005

Related U.S. Application Data

(63) Continuation of application No. 09/864,345, filed on May 25, 2001, now Pat. No. 6,804,705.

(60) Provisional application No. 60/264,744, filed on Jan. 30, 2001.

(51) Int. Cl.
| | | |
|---|---|---|
| *G06F 15/16* | (2006.01) | |
| *H04L 29/06* | (2006.01) | |
| *H04L 29/08* | (2006.01) | |
| *G06Q 10/10* | (2012.01) | |

(52) U.S. Cl.
CPC .............. *H04L 29/06* (2013.01); *H04L 67/34* (2013.01); *H04L 69/329* (2013.01); *H04L 67/02* (2013.01); *G06Q 10/10* (2013.01)
USPC .......................................... 709/219; 709/204

(58) Field of Classification Search
CPC ........ G06Q 10/00; H04L 29/00; H04L 67/00; H04L 69/00
USPC ..................... 709/219, 204; 707/999.003, 3
See application file for complete search history.

(56) References Cited

U.S. PATENT DOCUMENTS

| | | | |
|---|---|---|---|
| 5,220,674 A | 6/1993 | Morgan et al. | ................ 395/800 |
| 5,467,434 A | 11/1995 | Hower, Jr. et al. | ............ 395/114 |
| 5,694,551 A | 12/1997 | Doyle et al. | ................... 395/226 |

(Continued)

FOREIGN PATENT DOCUMENTS

| | | |
|---|---|---|
| EP | 0 738 956 A2 | 10/1996 |
| EP | 1 197 841 A2 | 4/2002 |

(Continued)

OTHER PUBLICATIONS

Mimeo.com, www.mimeo.com, 3 pages, May 3, 2001 (print date).

(Continued)

*Primary Examiner* — Tauqir Hussain
*Assistant Examiner* — Ebrahim Golabbakhsh
(74) *Attorney, Agent, or Firm* — Baker & Hostetler LLP

(57) ABSTRACT

A system facilitates the procurement of one or more document services for a document directly from a document preparation software application used to create the document. The system activates a graphical user interface within the document preparation software application, contacts a server to identify available document services, and configures the graphical user interface based on the available document services. The system detects selection of one of the available document services and provides the document from the document preparation software application to one or more service providers for performance of the selected document service.

24 Claims, 15 Drawing Sheets

1100 ⟶

(56) References Cited

U.S. PATENT DOCUMENTS

| | | | |
|---|---|---|---|
| 5,717,439 A | 2/1998 | Levine et al. | |
| 5,826,244 A | 10/1998 | Huberman | 705/37 |
| 5,895,454 A | 4/1999 | Harrington | 705/26 |
| 5,897,623 A | 4/1999 | Fein et al. | 705/27 |
| 5,918,214 A | 6/1999 | Perkowski | 705/27 |
| 5,970,472 A | 10/1999 | Allsop et al. | 705/26 |
| 5,995,723 A | 11/1999 | Sperry et al. | 395/114 |
| 6,055,512 A | 4/2000 | Dean et al. | 705/17 |
| 6,061,448 A | 5/2000 | Smith et al. | 380/21 |
| 6,064,979 A | 5/2000 | Perkowski | 705/26 |
| 6,078,906 A | 6/2000 | Huberman | 705/37 |
| 6,182,052 B1 | 1/2001 | Fulton et al. | 705/26 |
| 6,192,165 B1* | 2/2001 | Irons | 382/306 |
| 6,269,445 B1* | 7/2001 | Nishioka et al. | 713/168 |
| 6,289,460 B1* | 9/2001 | Hajmiragha | 726/28 |
| 6,330,542 B1 | 12/2001 | Sevcik et al. | 705/8 |
| 6,446,045 B1 | 9/2002 | Stone et al. | 705/26 |
| 6,470,448 B1* | 10/2002 | Kuroda et al. | 713/176 |
| 6,487,599 B1 | 11/2002 | Smith et al. | 709/229 |
| 6,546,002 B1 | 4/2003 | Kim | 370/351 |
| 6,619,868 B2 | 9/2003 | Ishida | 400/76 |
| 6,704,031 B1* | 3/2004 | Kimball et al. | 715/745 |
| 6,980,964 B1* | 12/2005 | Cocotis et al. | 705/26 |
| 7,234,103 B1* | 6/2007 | Regan | 715/234 |
| 7,401,125 B1* | 7/2008 | Uchida et al. | 709/217 |
| 7,447,713 B1* | 11/2008 | Berkheimer | 1/1 |
| 2001/0003190 A1 | 6/2001 | Shindo et al. | 709/217 |
| 2001/0047386 A1 | 11/2001 | Domenikos et al. | 709/203 |
| 2002/0013898 A1* | 1/2002 | Sudia et al. | 713/155 |
| 2002/0026379 A1 | 2/2002 | Chiarabini et al. | 705/26 |
| 2002/0029384 A1 | 3/2002 | Griggs | 725/46 |
| 2002/0065912 A1* | 5/2002 | Catchpole et al. | 709/224 |
| 2002/0078117 A1* | 6/2002 | Wang Baldonado et al. | 709/101 |
| 2002/0078160 A1* | 6/2002 | Kemp et al. | 709/208 |
| 2002/0111911 A1* | 8/2002 | Kennedy et al. | 705/51 |
| 2002/0198842 A1 | 12/2002 | Kurtz et al. | 705/51 |
| 2003/0002077 A1 | 1/2003 | Shima | 358/1.15 |
| 2003/0043402 A1 | 3/2003 | Manchala et al. | 358/1.14 |
| 2003/0055967 A1 | 3/2003 | Worley | 709/226 |
| 2003/0079002 A1 | 4/2003 | Fischer | 709/221 |
| 2003/0182438 A1 | 9/2003 | Tenenbaum | 709/232 |
| 2003/0223094 A1 | 12/2003 | Naito | 358/1.15 |
| 2004/0030995 A1 | 2/2004 | Bhogal et al. | 715/523 |
| 2012/0233080 A1* | 9/2012 | Triola | 705/316 |

FOREIGN PATENT DOCUMENTS

| | | |
|---|---|---|
| WO | WO 01/33329 A1 | 5/2001 |
| WO | WO 01/35207 A1 | 5/2001 |
| WO | WO 01/35312 A2 | 5/2001 |
| WO | WO 02/33532 A2 | 4/2002 |
| WO | WO 02/063483 | 8/2002 |
| WO | WO 02/01403 A1 | 1/2003 |

OTHER PUBLICATIONS

UPS, www.ups.com, 19 pages, Mar. 7, 2001 (print date).
NowDocs, www.nowdocs.com, 8 pages, Mar. 6, 2001 (print date).
Pitney Bowes iSend, www.isend.com, 5 pages, Mar. 7, 2001 (print date).
Pitney Bowes Press Release—iSend, "Pitney Bowes Teams with SAP to Revolutionize On-Line Document Delivery at the Enterprise Level", Sep. 14, 1999, 4 pages.
CertifiedMail.com, www.certifiedmail.com, 4 pages, Mar. 6, 2001 (print date).
Company Press Release, "Vestcom Selects Interliant as ASP for Its Web-based Document Delivery Solutions", Jun. 26, 2000, 4 pages.
iPrint.com, www.iprint.com, 4 pages, Mar. 7, 2001 (print date).
DHL, www.dhl-usa.com, 6 pages, Mar. 7, 2001 (print date).
United States Postal Service, www.usps.com, 10 pages, Mar. 7, 2001 (print date).
United States Postal Service, www.usps.com, 9 pages, Mar. 7, 2001 (print date).
Pitney Bowes, www.pb.com, 3 pages, Mar. 7, 2001 (print date).
Pitney Bowes DirectNET, www.directnet.pb.com, 5 pages, Mar. 7, 2001 (print date).
The Boulder County Business Report, www.bcbr.com, Feb. 25, 2000, 6 pages.
FedEx, www.fedex.com, 5 pages, Mar. 6, 2001 (print date).
Hulme, George V., "Secure Document Delivery Gains Favor", Jul. 17, 2000, Informationweek Online, www.informationweek.com, 3 pages.
Digital Zoo, www.digitalzoo.com.au, 5 pages, Mar. 6, 2001 (print date).
T. Orr et al., Government Computer News, "USPS inaugurates NetPost," www.gcn.com, Sep. 25, 2000, 2 pages.
U.S. Postal Service, "G091 NetPost Mailing Online," http://pe.usps.gov/text/dmm/g091.htm, Jul. 13, 2001 (print date), 4 pages.
Computing S.A., "Adobe Acrobat 5.0 to ship locally this month," www.computingsa.co.za/2001/04/09/Software/sof01.htm, Apr. 9, 2001, 8 pages.
Adobe Acrobat 5.0, "New Feature Highlights," www.adobe.com/products/acrobat/pdfs/acrnfhs.pdf, 7 pages.
Mimeo.com, www.mimeo.com,; Apr. 11, 2002 (print date); 15 pages.
Mimeo.com; 1-800-GO-mimeo.com; 3 pages; 2000.
Mimeo.com, Click, Print, Bind, Deliver © 1999-2000 Mimieo.com, Inc.
Mimeo.com, Click, Print, Bind © 1999-2001 Mimieo.com, Inc., pp. 1A-3A, and 1-13.
Mimeo.com, www.mimeo.com, Apr. 11, 2002 (print date), 8 pages.
www.mimeo.com, Copyright 1999-2001 Mimeo.com, Inc.
PCT International Search Report mailed May 31, 2002, in corresponding International Application No. PCT/US02/02145.
United States Patent and Trademark Office: Non-Final Office Action dated Jul. 5, 2002, U.S. Appl. No. 09/864,345.
United States Patent and Trademark Office: Final Office Action dated Dec. 20, 2002, U.S. Appl. No. 09/864,345.
United States Patent and Trademark Office: Non-Final Office Action dated Apr. 29, 2003, U.S. Appl. No. 09/864,345.
United States Patent and Trademark Office: Non-Final Office Action dated Oct. 29, 2003, U.S. Appl. No. 09/864,345.
United States Patent and Trademark Office: Notice of Allowance dated Jun. 4, 2004, U.S. Appl. No. 09/864,345.

* cited by examiner

SYSTEMS AND METHODS FOR PROVIDING ELECTRONIC DOCUMENT SERVICES

RELATED APPLICATION

This application is a continuation of U.S. patent application Ser. No. 09/864,345 filed May 25, 2001, which claims the benefit of U.S. Provisional Application Ser. No. 60/264,744, filed Jan. 30, 2001, the disclosures of which are incorporated herein by reference.

BACKGROUND OF THE INVENTION

1. Field of the Invention

The present invention relates generally to document services and, more particularly, to systems and methods that facilitate the obtainment of electronic document services in a secure manner.

2. Description of Related Art

Users or creators of documents often employ various document-related services, such as secure transmission, printing, duplication, certification, and filing of the documents. Some document-related services are offered by service providers, such as Federal Express, UPS, Kinko's, etc. To use one of these services, the user must print out the document and physically take the document to the service provider or otherwise arrange for the document to be delivered to the service provider.

Other document-related services are offered over the Internet. To use one of these services, the user must create the document using document creation software, such as Microsoft Word or Corel WordPerfect, or otherwise obtain an electronic version of the document. The user must then activate web browser software, such as Microsoft Internet Explorer or Netscape Navigator, and locate the service provider on the Internet. The user normally must register with the service provider and then provide the document to the service provider.

In addition, users often have to execute software, such as a print driver or third party software outside the application to create electronic versions of the document suitable for uploading to the service provider. Often, users also need to close the document on which they are working.

In any event, it is a time-consuming process to obtain document-related services. Further, the confidentiality of the documents is usually not assured. As a result, there is a need for mechanisms that facilitate the obtainment of document-related services in a secure manner.

SUMMARY OF THE INVENTION

Systems and methods consistent with the present invention address this and other needs by providing electronic document services in a secure manner to a user directly from the graphical user interface of the document preparation software used to create the document. The systems and methods may also provide progress information regarding performance of the electronic document services to the user.

In accordance with the purpose of the invention as embodied and broadly described herein, a system obtains one or more document services for a document directly from a document preparation software application used to create the document. The system activates a graphical user interface within the document preparation software application, contacts a server to identify available document services, and configures the graphical user interface based on the available document services. The system detects selection of one of the available document services and provides the document from the document preparation software application to one or more service providers for performance of the selected document service.

The system may receive progress information regarding performance of the selected document service and present the progress information within the document preparation software application. The progress information may be provided in the form of a graphical progress meter, a pop-up window, or a drop-down window, possibly within a display of the graphical user interface.

In another implementation consistent with the present invention, a graphical user interface stored in a computer facilitates the obtainment of document services for a document. The graphical user interface is implemented within a document preparation application used to create the document. The graphical user interface includes instructions for contacting a server to identify available document services; instructions for configuring a plurality of graphical selectable objects based on the available document services, each of the graphical selectable objects corresponding to one of the available document services; instructions for detecting selection of one of the available document services based on selection of one of the graphical selectable objects; and instructions for providing the document from the document preparation application to one or more service providers for performance of the selected document service.

In yet another implementation consistent with the present invention, a server, in communication with one or more clients to provide a plurality of document services, includes a memory and a processor. The memory is configured to store data regarding the plurality of document services. The processor is configured to receive a request from a client for information regarding available ones of the document services, provide the requested information to the client to permit the client to configure a graphical user interface, obtain a document from the client and a selection of one of the available document services, and perform the selected document service on the document. In alternate implementations, the client itself performs some of these operations.

In a further implementation consistent with the present invention, a system obtains document services. The system includes a document preparation application and a graphical user interface. The document preparation application is configured to create a plurality of documents. The graphical user interface is integrated within the document preparation application. The graphical user interface includes a plurality of graphical selectable objects. Each of the graphical selectable objects corresponds to one of a plurality of document services. The graphical user interface configures the graphical selectable objects based on available ones of the document services, detects selection of one of the graphical selectable objects, and provides a document created by the document preparation application to one or more service providers for performance of the document service corresponding to the selected graphical selectable object.

In another implementation consistent with the present invention, a document preparation application, executed on a computer, includes instructions for activating a toolbar, the toolbar containing a plurality of selectable objects; instructions for contacting a server to identify available document services; instructions for configuring the selectable objects based on the available document services, each of the selectable objects corresponding to one of the available document services; instructions for detecting selection of one of the selectable objects; instructions for collecting processing instructions relating to a document prepared using the document preparation application; and instructions for sending a document and the processing instructions over a secure communications path to one or more service providers for performing the available document service corresponding to the selected object.

In yet another implementation consistent with the present invention, an automated method obtains one or more document services for a document directly from a document preparation software application used to create the document. The method includes activating a graphical user interface within the document preparation software application; configuring the graphical user interface to include a plurality of predetermined selectable objects, each of the selectable objects corresponding to one of a plurality of different document services; detecting selection of one of the document services; and providing the document from the document preparation software application to one or more service providers for performance of the selected document service.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

Figure 1:
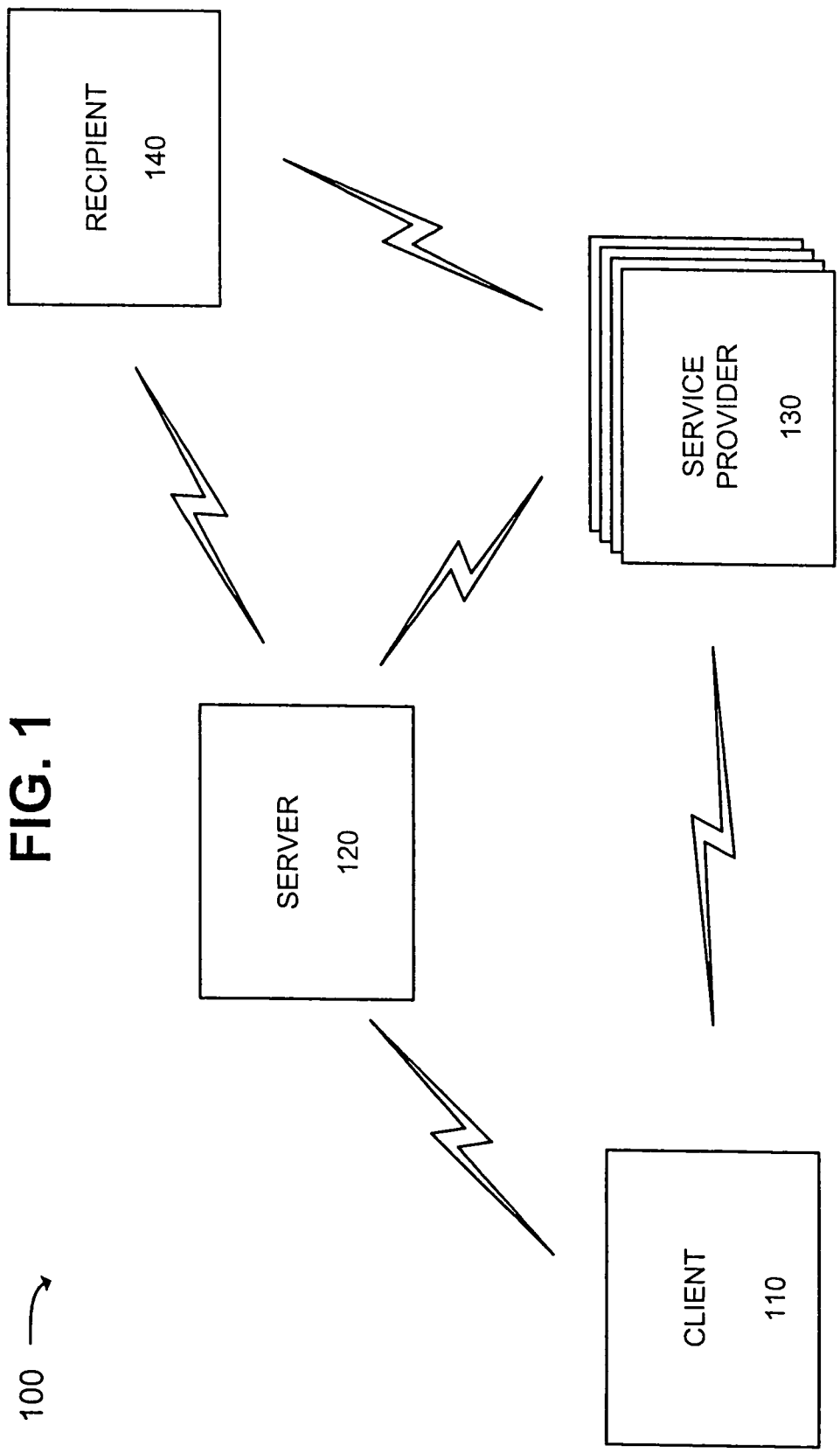
FIG. 1 is a block diagram of the exemplary system in which systems and methods consistent with the present invention may be implemented.

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Overview

Systems and methods consistent with the present invention provide electronic document services. The system provides a graphical user interface, such as a toolbar, that offers a unique and novel way to access and deploy various document services. The toolbar may be created using any type of computer programming language (e.g., JAVA, Visual Basic, C++) and either: (1) resides as an image directly within one or more of the borders of the visual graphic user interface (GUI) of any type of document preparation computer software application (e.g., Microsoft's Word, Excel, or PowerPoint, Corel's WordPerfect, Lotus's WordPro, Adobe's Acrobat, Quicken's QuickBooks, etc.), or (2) resides as an image superimposed on the document(s) being created through the document preparation application software.

The toolbar may include a series of separate icon activation buttons that perform different functions or one or more identifiable brand icon activation buttons that, when activated (e.g., clicked) by a user, drops down one or more separate activation icons and/or a list of functions. The service functions offered through the system may also be accessed and used by a user through a right click of a computer mouse without direct activation through the system toolbar. The toolbar may receive information and transmit information via TCP/IP and/or other protocols over the Internet or other networks, unlike conventional buttons or icons.

Without the customary inconvenient requirements of the user: (1) independently closing the document(s) created in the document preparation application software or (2) separately activating the user's web browser application software (e.g., Netscape Navigator, Microsoft's Internet Explorer, etc.), the activation icons of the toolbar, when activated, enable the user to quickly and efficiently access and use document services via the Internet (optimally, taking no more than 3 mouse clicks or taking no more than 60 seconds of time).

The document services relate to the document(s) created by the user in the document preparation software application and may include:

- electronic signature of the relevant document(s) by the user ("E-Signature Service");
- certified, high-encryption electronic transmission of the document(s) to a recipient ("E-Mail Service"), regardless of whether the recipient of the document(s) is a user of the system;
- delivery of the document(s) via an overnight courier service, such as FedEx, UPS, DHL, etc. ("Overnight Courier Service"), regardless of whether the recipient of the document(s) is a user of the system;
- off-site electronic storage and retrieval of the document(s) ("Data Storage Service");
- initiation of U.S. Post Office mail delivery services for the document(s), even after hours ("Traditional Mail Service"), regardless of whether the intended recipient of the document(s) is a user of the system;
- same day in-person messenger delivery services ("By Hand Delivery Service"), regardless of whether the intended recipient of the document(s) is a user of the system;
- international translation services for the document(s) ("Translation Service");
- physical and/or electronic filing services for the document(s) at city, state, and federal offices, courts, and agencies (e.g., the Internal Revenue Service, the Federal Trade Commission, the U.S. Securities and Exchange Commission, etc.) ("Government Filing Service"), regardless of whether the intended recipient of the document(s) is a user of the system;
- printing, copying, and binding services relating to the document(s), such as those services ordinarily performed by service providers, such as Kinko's, and making subsequent physical delivery of the document(s) in any one or more manners provided for herein ("Print and Copy Room Service"), regardless of whether the intended recipient of the document(s) is a user of the system;

personal and business information management services linking the document(s) and the functions used to the names and addresses (both physical and electronic) of the user's business and personal contacts for the purpose of facilitating document delivery in any one or more of the different manners contemplated herein ("Address Book Management Service");

electronic and simultaneous collaboration of services related to the document(s) ("E-Collaboration Service"); and various other document services, such as facsimile services.

Through use of the toolbar, the user will have access to one or all of the above-described services through a limited number of computer mouse clicks (or similar acts), even though the user may not have direct physical access to any of the required facilities or providers of the services. For example, the use of any one or more of the functions will not require the user to physically leave the location at which the document was created and will not require the user to do any of the following: (i) physically print or make copies of the document(s); (ii) place the document(s) into envelope(s); (iii) prepare mailing label(s); (iv) either go to or arrange for the delivery of the document(s) at the drop-off office of a courier in order to facilitate the delivery of the document(s) to the ultimate destination; (v) go to the U.S. Post Office; (vi) go to a copy provider; or (vii) arrange for an in-office courier pickup to take the document(s) to the ultimate destination.

Further, through a program underwritten by a commercial insurance carrier possibly integrated into the system, any one or more of the functions may be performed under "bond" (i.e., the user can be paid a scheduled indemnity in the event that any one or more of the functions is not correctly performed). This provides the user with some monetary guarantee that the functions will be performed correctly.

Any of the functions offered through the toolbar may be offered on a direct basis through the entity providing the system. Conversely, any of the functions offered through the toolbar may be provided in conjunction with established providers of the functions outside the system (e.g., FedEx, Kinko's, UPS, DHL, the U.S. Post Office, etc.).

Exemplary System

An exemplary system consistent with the present invention includes various logical groupings of entities provided by one or more devices. An "entity" refers to a device, resource, data, or functionality that can be accessed by a user, program, device, or another entity, that can be computational, storage-related, communication-related, or related to providing access to another user. Examples of entities include software, such as application programs, threads, and processes; information, such as databases and files; objects as traditionally defined in the art, including, but not limited to, Component Object Model (COM), COM+, or Common Object Request Broker Architecture (CORBA)-compliant objects, or other objects that do not necessarily comply with an over-arching object model; and hardware, such as computer devices and components.

In an interaction between two entities within the exemplary system, the "client" entity requests services (directly or indirectly) from the "server" or "service provider" entity over secure or highly secure transmission media. The client, server, and service provider entities may physically reside on a single computer or on multiple computers.

FIG. 1 is a block diagram of the exemplary system 100 in which systems and methods consistent with the present invention may be implemented. The system 100 includes a client 110, a server 120, and possibly one or more service providers 130. The client 110, server 120, and service providers 130 may be implemented as one or more devices and may communicate via any communications medium (e.g., by wired or wireless communication; via a network, such as the Internet; via a storage device; via telephone; etc.). In an implementation consistent with the present invention, the client 110 or server 120 may perform the functions of one or more of the service providers 130.

The client 110 is an entity that can communicate with the server 120 and/or service provider(s) 130, such as a personal computer, a laptop, a personal digital assistant (PDA), some equivalent smart or dumb terminal, a thread or process running on one of these devices, or an object executable by one of these devices. The server 120 may include an entity that provides or facilitates the provisioning of document services to the client 110. A single client 110 and server 120 have been shown for simplicity. One skilled in the art would recognize that the system 100 may include any number of clients 110 and servers 120.

The service provider 130 may include an entity that provides one or more document services as will be described in more detail below. For example, the service provider 130 may include an established provider of document services, such as the U.S. Post Office, FedEx, UPS, or Kinko's. In some cases, the service provider 130 may take the form of a network-based (e.g., Internet-based) provider of document services. In other cases, the service provider 130 may take the form of a network-independent provider of document services. In yet other cases, the service provider 130 may take the form of a combination of a network-based and network-independent provider of document services.

The server 120 and/or service provider 130 may further communicate with a recipient 140. The recipient 140 may be the ultimate receiver of the document services provided by the server 120 and/or service provider 130. In some cases, the recipient 140 may include the client 110. In other cases, the recipient 140 includes an individual, company, or entity separate from the client 110.

Exemplary Client

Figure 2:
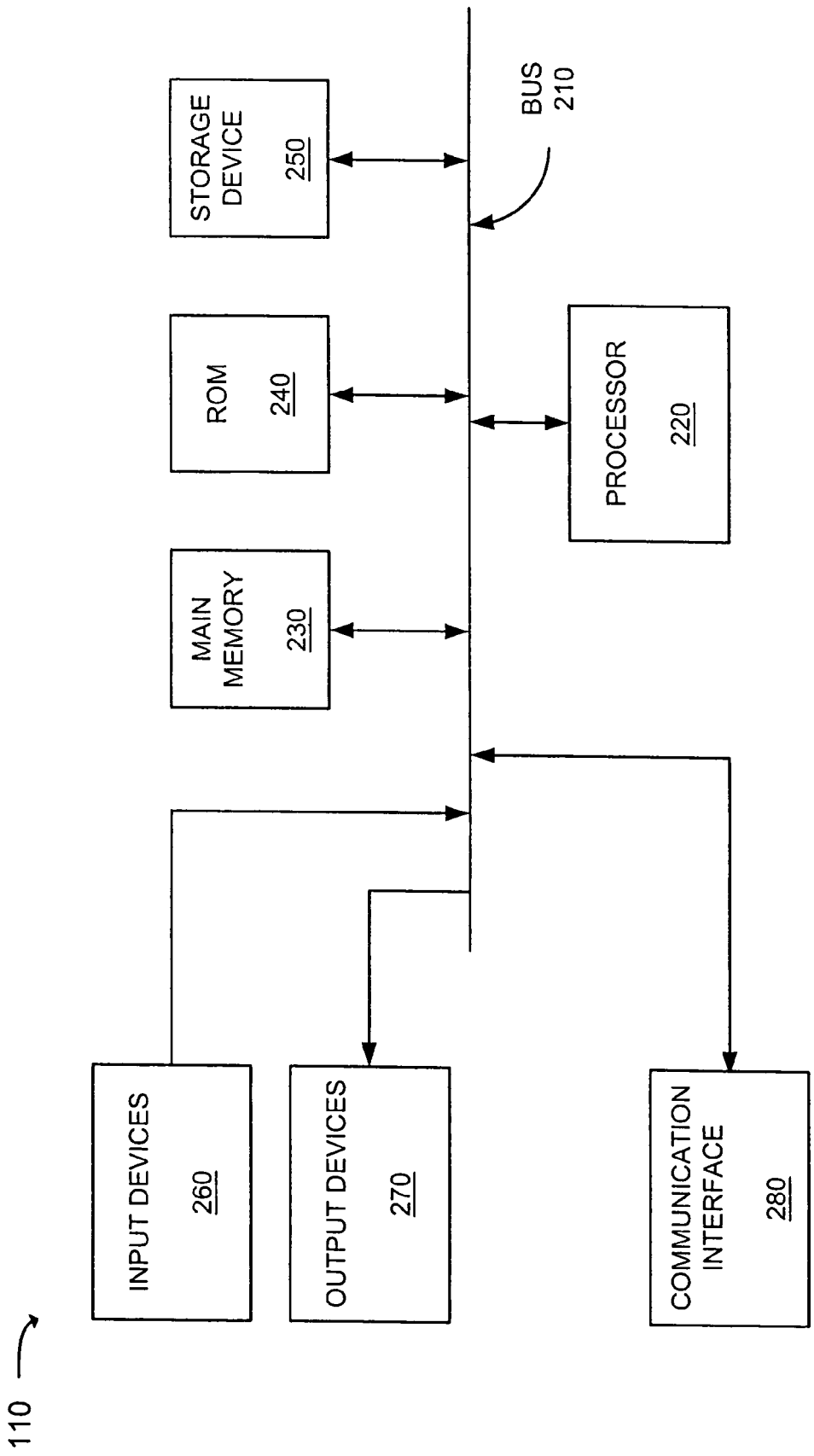
FIG. 2 is an exemplary diagram of a device that may incorporate the client of FIG. 1 in an implementation consistent with the present invention.

FIG. 2 is an exemplary diagram of a device that may incorporate the client 110 in an implementation consistent with the present invention. The client 110 may include a bus 210, a processor 220, a main memory 230, a read only memory (ROM) 240, a storage device 250, one or more input devices 260, one or more output devices 270, and a communication interface 280. The bus 210 may include one or more conductors that permit communication among the components of the client 110.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input devices 260 may include one or more conventional mechanisms that permit a user to input information to the client 110, such as a keyboard, a mouse, a pen, voice recognition and/or biometric mechanisms, etc. The output devices 270 may include one or more conventional mechanisms that output information to the user, including a display, a printer, a speaker, etc. The communication interface 280 may include any transceiver-like mechanism that enables the client 110 to communicate with other devices and/or systems. For example, the communication interface 280 may include mechanisms for communicating with another device or system via a network, such as network 140.

As will be described in detail below, the client 110, consistent with the present invention, facilitates the selection and activation of certain document-related services. The client 110 may accomplish this, at least in part, in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Computer-Readable Medium

Figure 3:
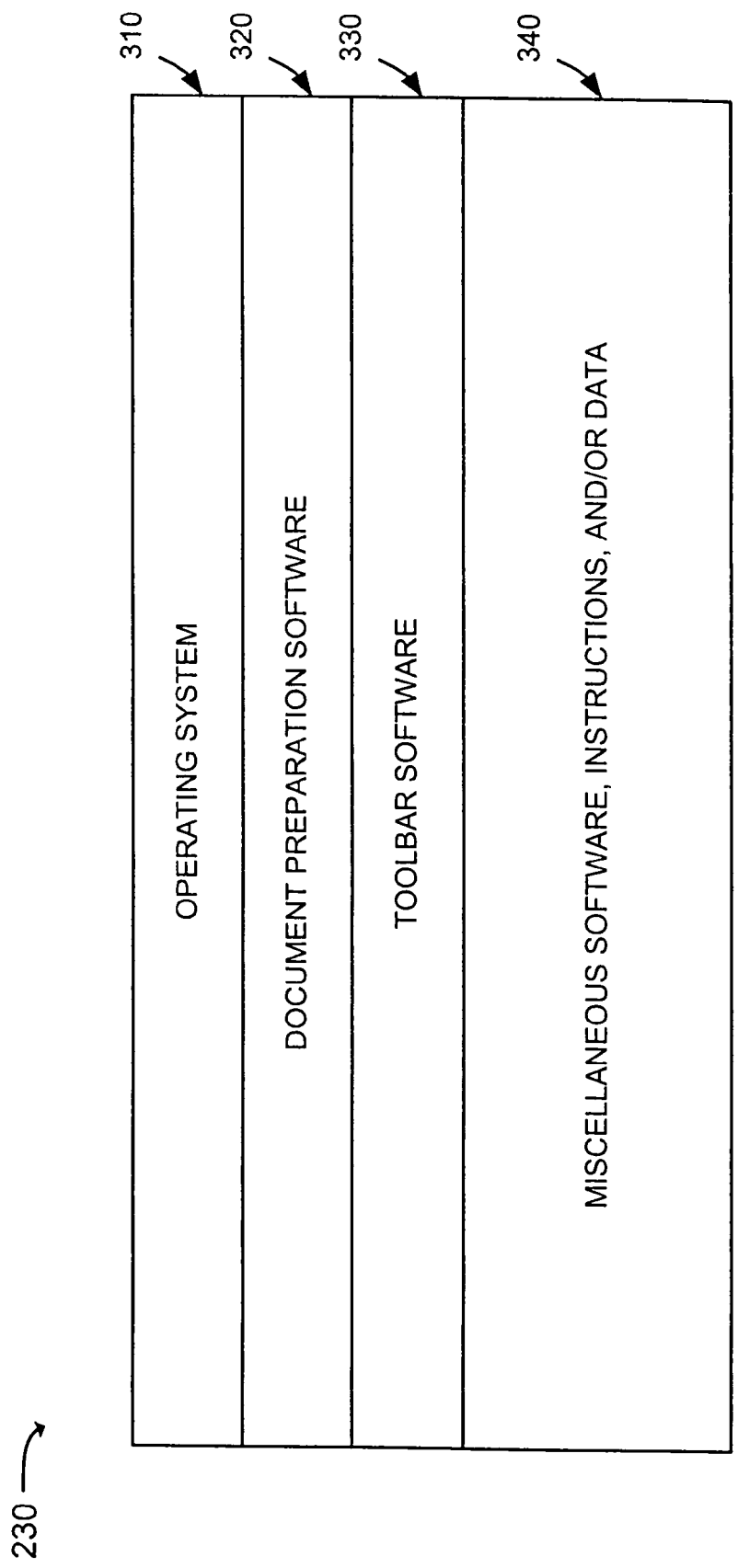
FIG. 3 is a diagram of an exemplary computer-readable medium used by the client of FIG. 2 according to an implementation consistent with the present invention.

FIG. 3 is a diagram of an exemplary computer-readable medium used by the client 110 according to an implementation consistent with the present invention. In this implementation, the computer-readable medium includes memory 230. The memory 230 may include an operating system 310, document preparation software 320, toolbar software 330, and miscellaneous software, instructions, and data 340.

The operating system 310 may include conventional operating system software, such as the Windows, Unix, Linux, MacOS, WAP, Psion, WinCE, and PalmOS operating systems. The document preparation software 320 may include conventional word processing software, such as Microsoft Word, Corel WordPerfect, and Lotus WordPro; spreadsheet software, such as Microsoft Excel; financial analysis software, such as Quicken QuickBooks; and/or other types of software, such as Microsoft PowerPoint and Adobe Acrobat.

The toolbar software 330 may be implemented as a plug-in, an applet, a dynamic link library (DLL), or a similar executable object. The client 110 may obtain the plug-in from the server 120 or from a third party, such as a third party server, disk, tape, network, CD-ROM, etc. Alternatively, the plug-in may be pre-installed on the client 110 or may be integrated into the document preparation software 320.

The toolbar software 330 may be automatically activated upon initiation of the document preparation software 320. Alternatively, the toolbar software 330 may be activated when instructed by a user. In either case, the toolbar software 330 may take the form of a graphical user interface, such as a tool bar, software button, and/or menu, that provides an extension to the document preparation software 320.

Figure 4:
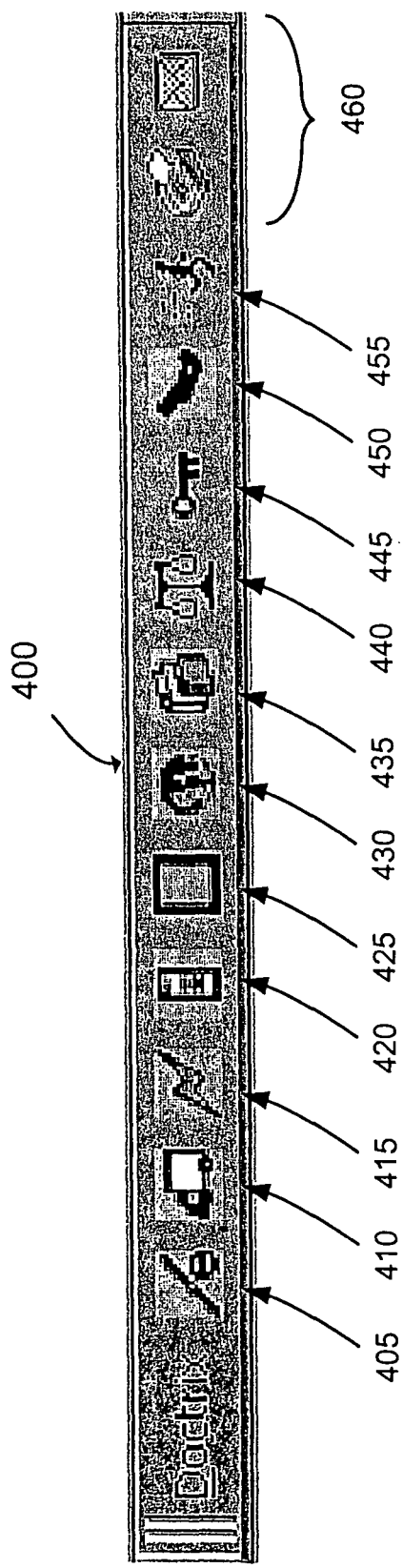
FIG. 4 is an exemplary diagram of a graphical user interface in the form of a toolbar that includes the toolbar software of FIG. 3 according to an implementation consistent with the present invention.

FIG. 4 is an exemplary diagram of a graphical user interface in the form of a toolbar 400 that includes the toolbar software 330 according to an implementation consistent with the present invention. The toolbar 400 may include a number of software buttons that implement certain document-related services, some of which may be performed under bond, all initiated from within the document preparation software 320. For example, the software buttons may include an E-Signature Service button 405, an Overnight Courier Service button 410, an E-Mail Service button 415, a Data Storage Service button 420, a Traditional Mail Service button 425, a Translation Service button 430, a Print and Copy Room Service button 435, a Government Filing Service button 440, a By Hand Delivery Service button 445, an Address Book Management Service button 450, an E-Collaboration Service button 455, and various other document services buttons 460.

The E-Signature Service button 405 may initiate an electronic or digital signature function to permit a user to officially sign a document using, for example, an image of the user's signature or a digital cryptographic signature. This function may add an electronic or digital signature to a document. For an electronic signature, the user may provide a signature to a service provider and receive the signature in electronic form for pasting directly into the document. For example, the user may fax the signature to the service provider and the service provider may return the signature, in electronic form, to the user via e-mail. For a digital signature, the user may digitally sign the document and provide the digitally signed document to the service provider for authentication and, possibly, forwarding to a recipient.

The Overnight Courier Service button 410 may initiate overnight delivery of the document via a courier service. This function may provide a price comparison for shipping options, payment via credit or debit card, very late pickup times, and where legally permissible, the assignment of an earlier date to the receipt, transmission, or processing of the document (e.g., a document received, transmitted, or processed after midnight may be assigned a date of the previous day). The user may provide the document and delivery instructions electronically to a secure location of a service provider, which may include a courier service or a service provider operating in partnership with a courier service. When the local service provider (e.g., an east coast service provider) is closed, the document may be automatically delivered to another service provider (e.g., a west coast service provider) that is open. The service provider may print the document, put it in an envelope, and deliver it according to the user's instructions.

The E-Mail Service button 415 may initiate a certified, high-encryption electronic transmission of a document to a recipient. This function may provide high-encryption, possibly bonded, delivery of attachments over a network, such as the Internet. The encryption may be implemented using peer-to-peer techniques or through the user of a central key server. The function may provide return-receipt when read. Also, the encrypted document may be set to expire after a certain period of time and may be designated as read-only or on-screen only (i.e., no print ability).

The Data Storage Service button 420 may initiate a secure network (e.g., Internet) backup and storage service for remote retrieval. This function may provide open, save, and archive functionality directly from within the document preparation software 320. This may permit a user to later access the document from any device that has access to the network and share the document with others.

The Traditional Mail Service button 425 may initiate a function to permit a user to have a document certified, registered, and delivered by the U.S. Post Office even after normal postal hours. This function may provide a price comparison for shipping options and payment via credit or debit card. The user may provide the document and delivery instructions electronically to a secure location of a service provider, which may include the Post Office or a service provider operating in partnership with the Post Office. The service provider may establish a virtual post office that is open 24 hours a day, 7 days a week. The service provider may print the document, place it in an envelope, and certify and/or register it for delivery by the Post Office.

The Translation Service button 430 may initiate a function to translate a document into one or more languages. This function may provide varying degrees of translation, from a quick, rough translation to a formal and official translation. The user may provide the document electronically to a secure location of a service provider. The service provider may translate the document, as appropriate, and return the translated document to the user.

The Print and Copy Room Service button 435 may initiate a function to print and send one or more bound copies of the document. This function may provide document printing, copying, and binding services and delivery of the documents to one or more recipients, regardless of whether the recipients include the user providing the original document. The user may provide the document with document handling and delivery instructions electronically to a secure location of a service provider, which may include a conventional copy center or a service provider independent from the conventional copy center. The service provider may then print the document and perform the necessary handling and delivery services as instructed by the user.

The Government Filing Service button 440 may initiate a function to permit same day, in person, delivery of a document. This function may provide delivery services for multiple government offices, agencies, and courts in multiple cities and/or countries. The user may provide the document and identify the recipient of the document electronically to a secure location of a service provider, which may include a delivery service or a service provider operating in partnership with a delivery service. The service provider may be located in the locality of the recipient to facilitate the delivery of the document. Upon receiving the document, the service provider may print it and have it delivered to the identified recipient.

The By Hand Delivery Service button 445 may initiate a function to permit same day, in person, messenger delivery service of a document. This function may provide messenger delivery services for multiple cities and/or countries. The user may provide the document and identify the address of the recipient of the document electronically to a secure location of a service provider, which may include a messenger delivery service or a service provider operating in partnership with a messenger delivery service. The service provider may be located in the locality of the recipient to facilitate the delivery of the document. Upon receiving the document, the service provider may print it and have it delivered to the identified recipient.

The Address Book Management Service button 450 may initiate a function to manage personal and business information of a user. This function may provide a one-click importing of information relating to a recipient of a document. The function may interact with conventional address/contact book software on one or more devices.

The E-Collaboration Service button 455 may initiate a function to create a simultaneous drafting session of a document or provide the document concurrently to multiple recipients for review or comments. This function may permit the user to obtain everyone's comments on the document virtually simultaneously.

The various other document services buttons 460 may initiate other document-related services not specifically mentioned herein, such as facsimile services.

The toolbar 400 may take different forms within the graphical user interface of the document preparation software 320. FIGS. 5A-5D are exemplary diagrams of configurations of the toolbar 400 according to implementations consistent with the present invention. In other implementations, the toolbar 400 may take yet other forms.

Figure 5A:
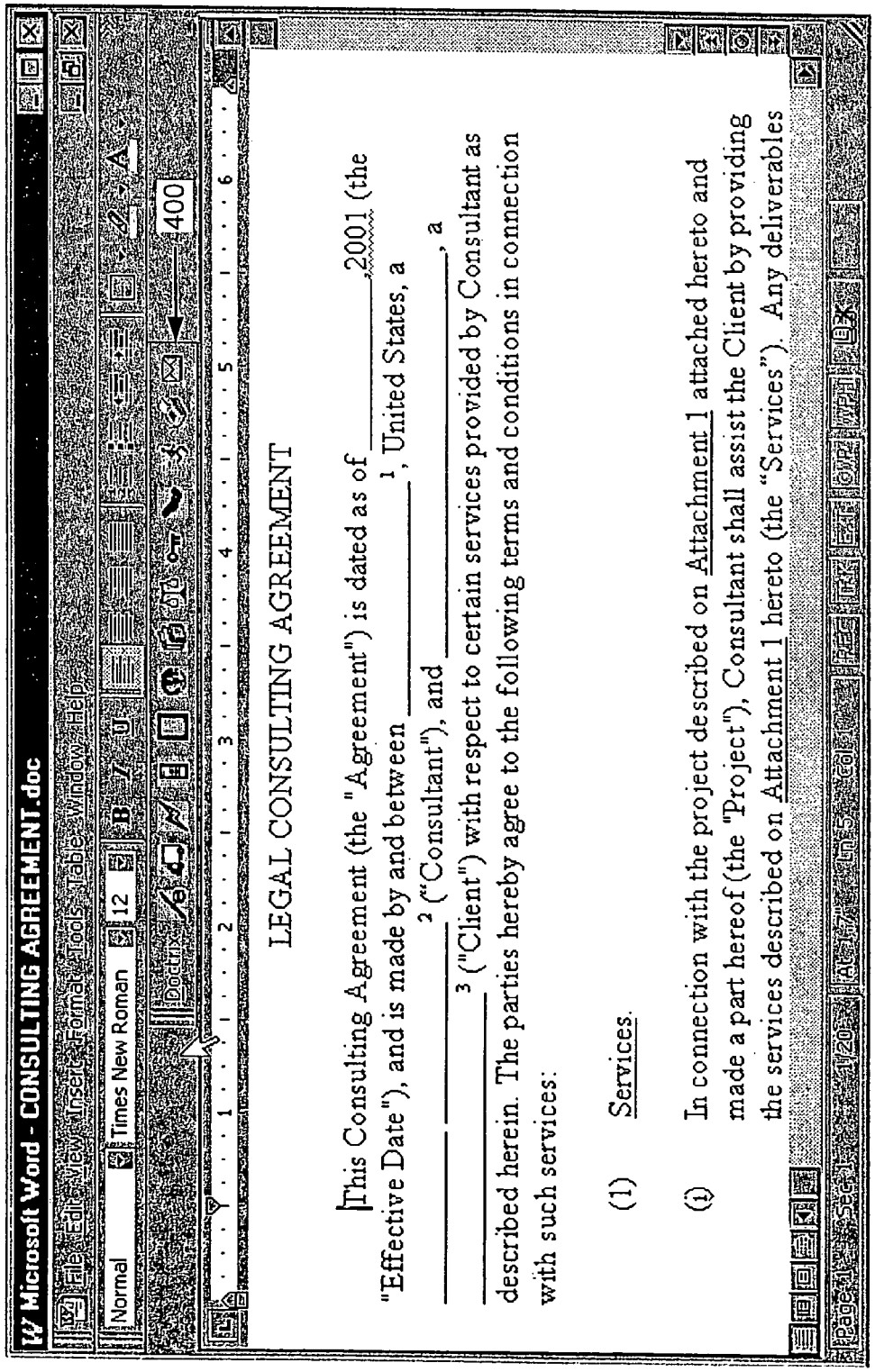
FIGS. 5A-5D are exemplary diagrams of configurations of the toolbar of FIG. 4 according to implementations consistent with the present invention.
Figure 5B:
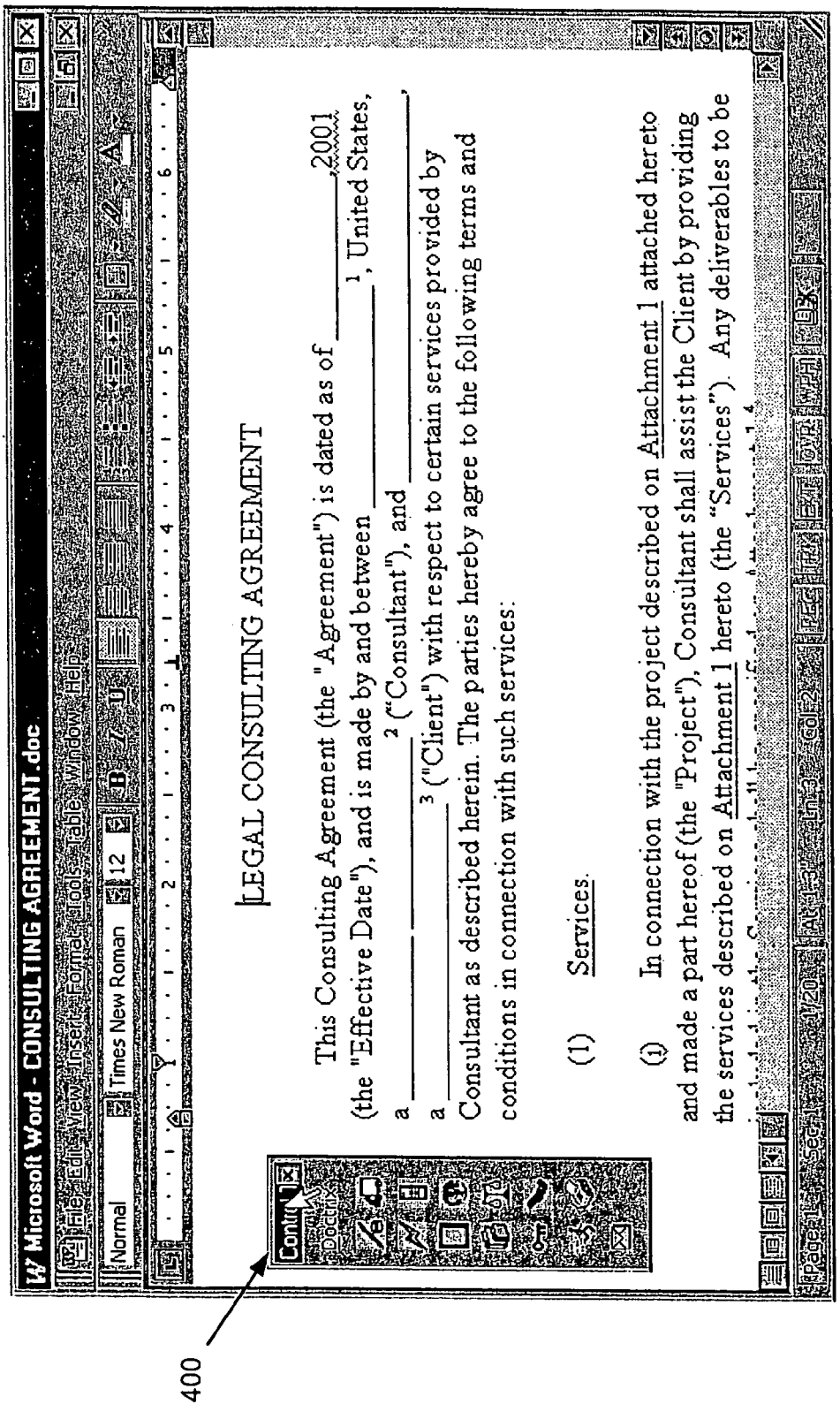
Figure 5C:
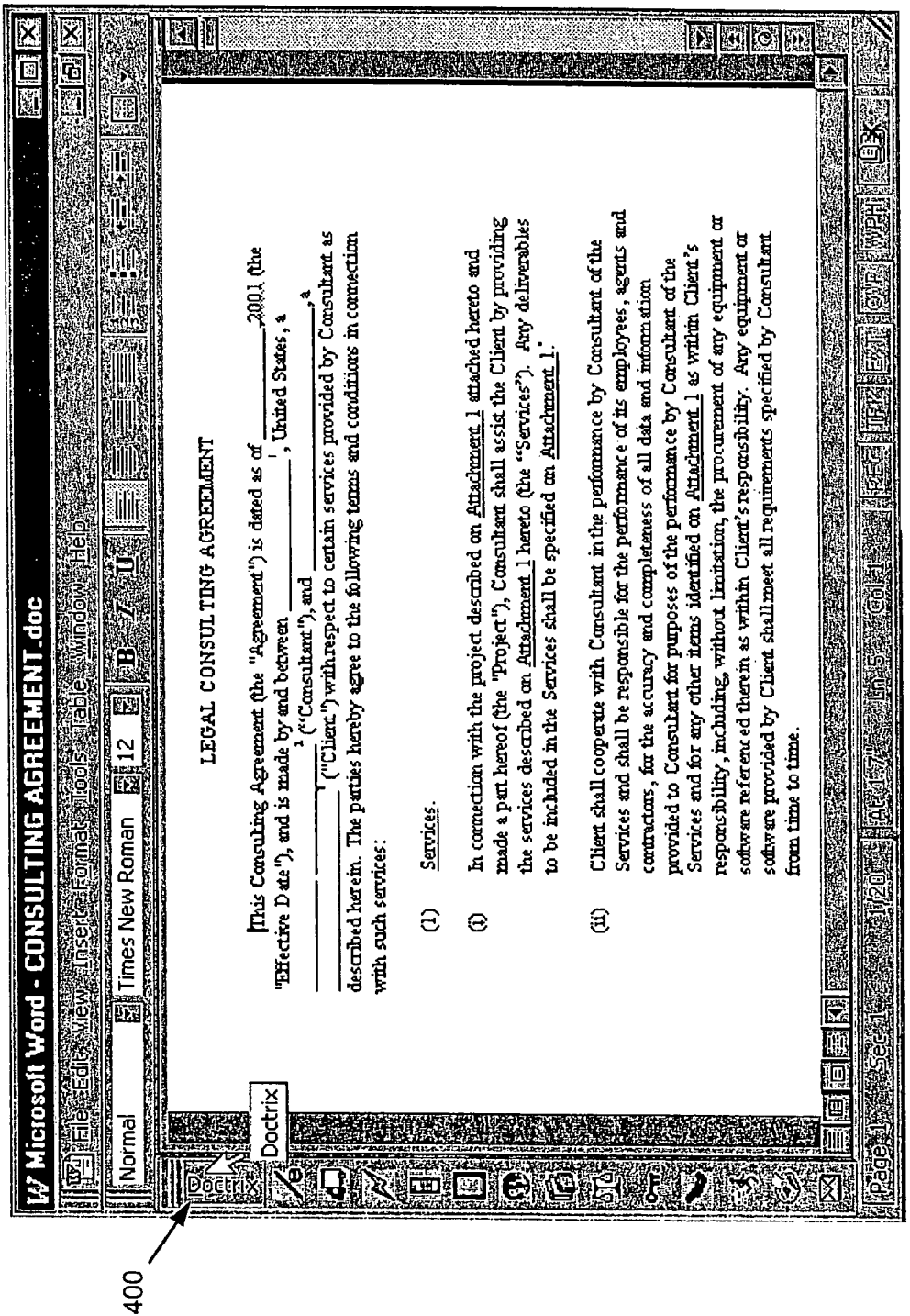
Figure 5D:
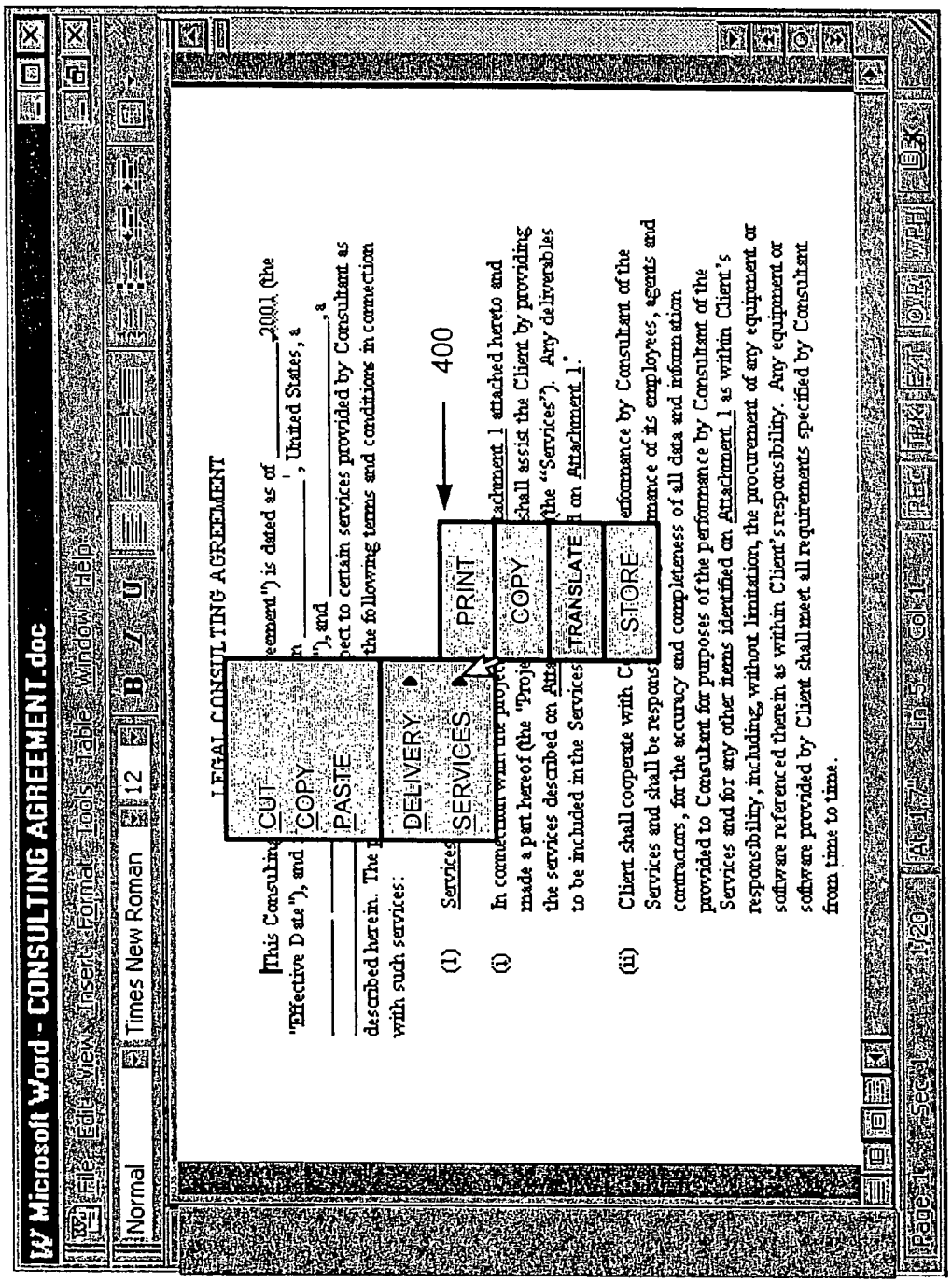

In FIG. 5A, the toolbar 400 takes the form of a conventional horizontal toolbar, such as the Standard and Formatting toolbars used by Microsoft Word. In FIG. 5B, the toolbar 400 takes the form of a floating toolbar that may be moved around the graphical user interface of the document preparation software 320. In FIG. 5C, the toolbar 400 takes the form of a vertical toolbar. In FIG. 5D, the toolbar 400 takes the form of a menu that may be initiated by a right click of a mouse.

Returning to FIG. 3, the miscellaneous software, instructions, and/or data may include other software, instructions, or data used by the client 110, such as browser software.

Exemplary Server

Figure 6:
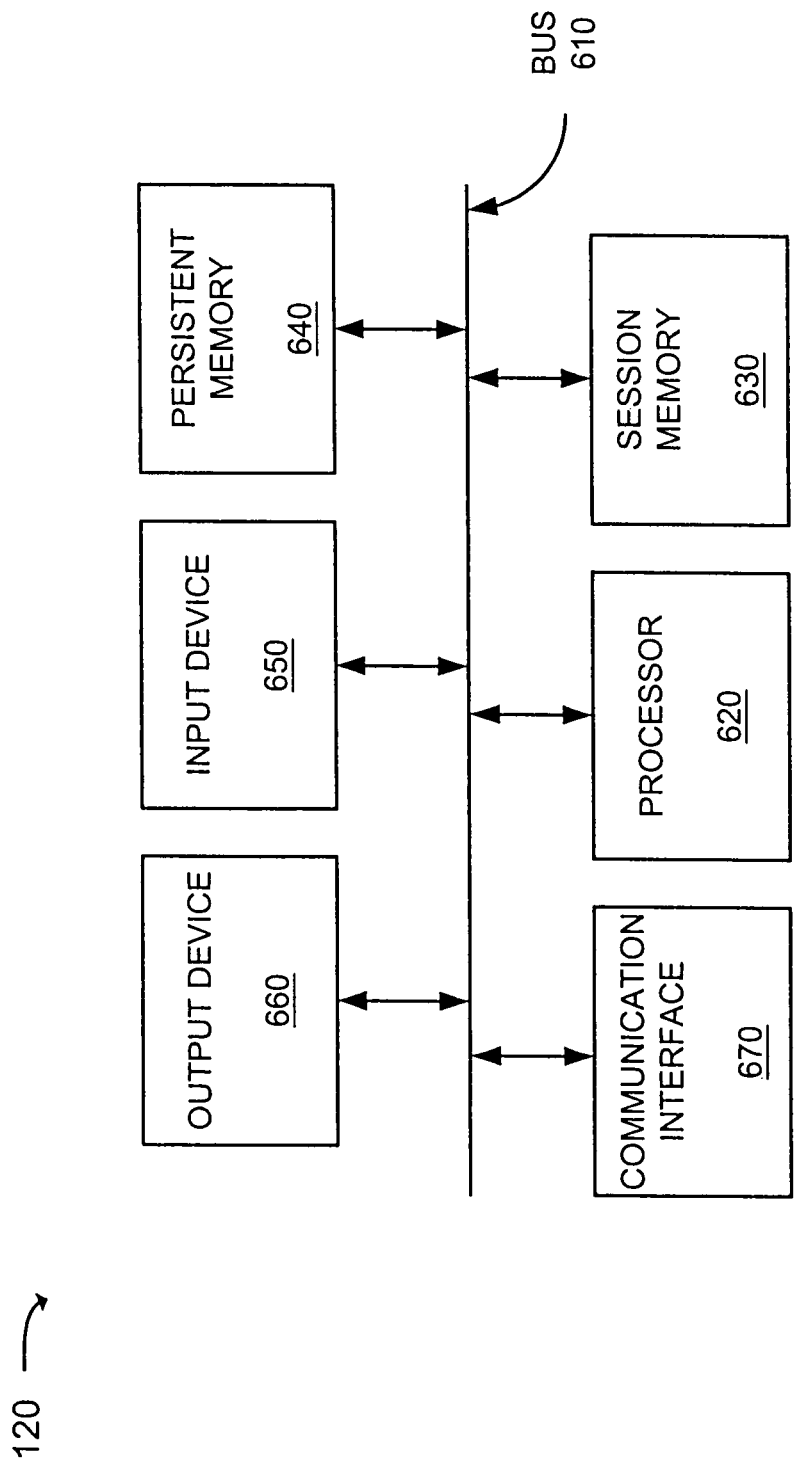
FIG. 6 is an exemplary diagram of a device that may incorporate the server of FIG. 1 in an implementation consistent with the present invention.

FIG. 6 is an exemplary diagram of a device that may incorporate the server 120 in an implementation consistent with the present invention. The server 120 may include a bus 610, a processor 620, a session memory 630, a persistent memory 640, one or more input devices 650, one or more output devices 660, and a communication interface 670. The bus 610 permits communication among the components of the server 120. The processor 620 may be any type of conventional processor or microprocessor that interprets and executes instructions.

The session memory 630 may include a RAM or another type of dynamic storage device that stores information and instructions to be executed by the processor 620, and/or a ROM or another type of static storage device that stores static information and instructions for use by the processor 620. The persistent memory 640 may include a hard disk, a floppy disk, a CD-ROM, a DVD-RAM, and/or some other type of magnetic or optical recording medium and its corresponding drive.

The input devices 650 may include any conventional mechanisms capable of inputting information into the server 120, such as a keyboard, a mouse, a pen, voice recognition and/or biometric mechanisms, etc. The output devices 660 may include any conventional mechanisms capable of outputting information from the server 120, including a display, a printer, a speaker, etc. The communication interface 670 may include any transceiver-like mechanism that enables the server 120 to communicate with other devices and/or systems.

Figure 7A:
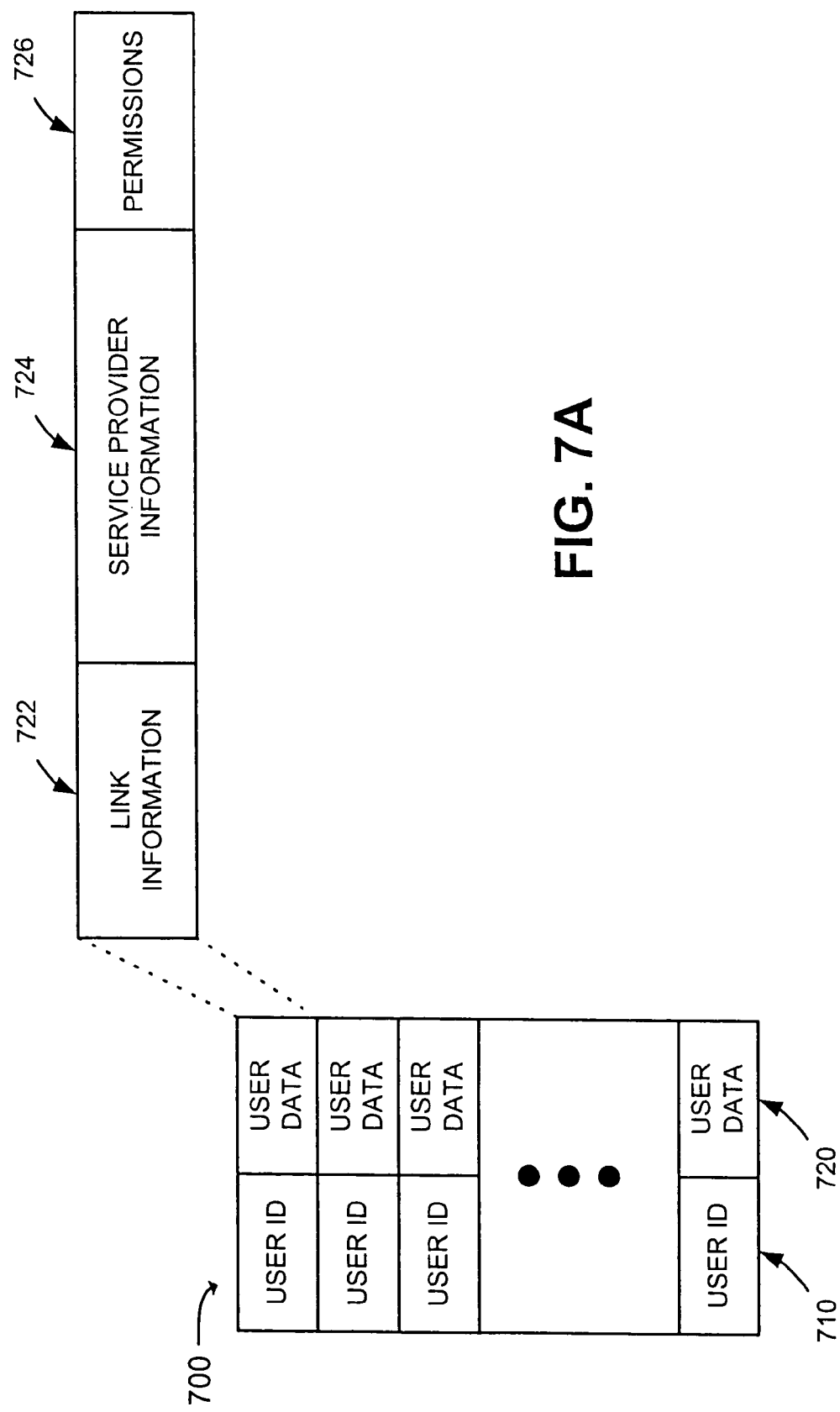
FIGS. 7A and 7B are diagrams of two exemplary databases that may be maintained by the server of FIG. 6 according to an implementation consistent with the present invention.
Figure 7B:
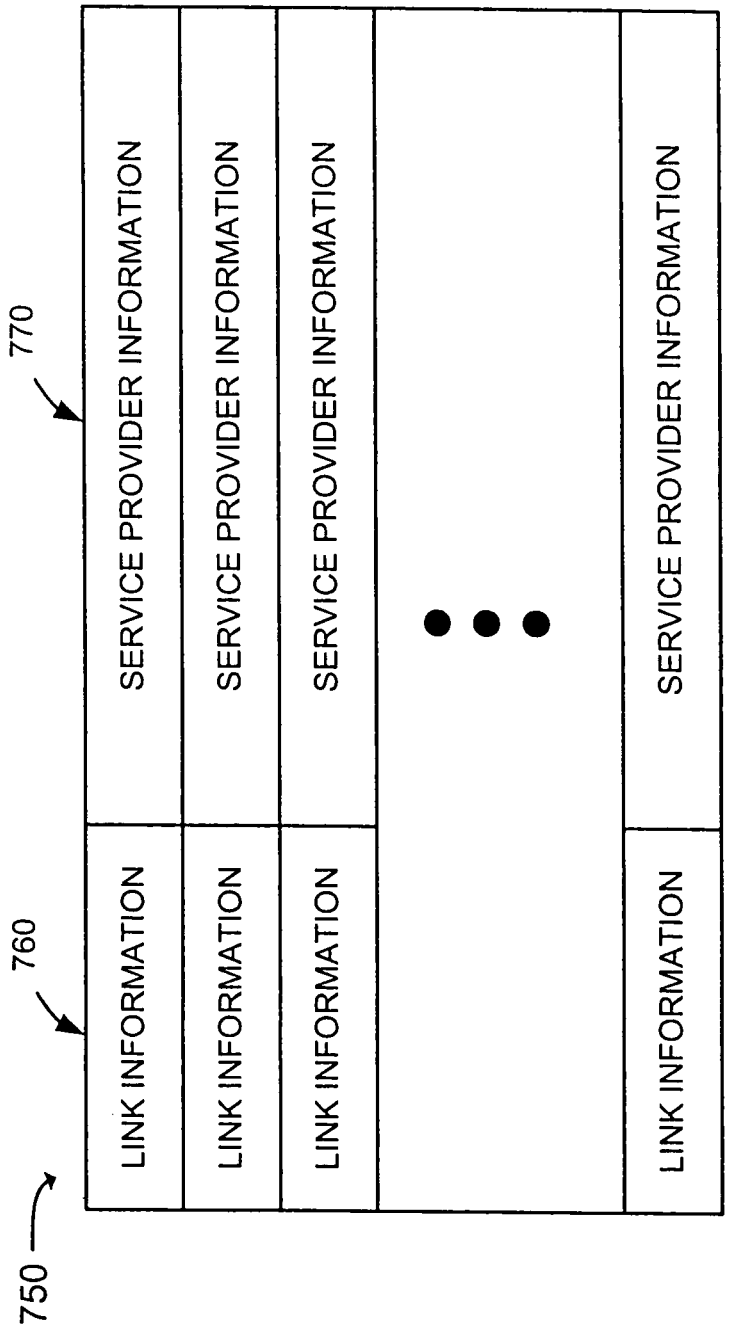

FIGS. 7A and 7B are diagrams of two exemplary databases 700 and 750, respectively, that may be maintained by the server 120 according to implementations consistent with the present invention. The server 120 may use the databases 700 and 750 to provide certain document-related services and/or identify providers of these services. As described in more detail below, the information in the databases 700 and 750 may be used to dynamically customize a user's toolbar 400.

In other implementations consistent with the present invention, the server 120 includes more, less, or neither of these databases. The contents of the databases 700 and 750 may physically reside in a single memory device, such as memory 630 or 640 (FIG. 6), or may be distributed among memory devices. Further, the contents of the databases 700 and 750 may or may not be contiguous and may or may not be stored in encrypted form. The databases 700 and 750 may reside in any type of memory, computer-readable medium, or carrier wave.

In FIG. 7A, the database 700 may include multiple entries that contain a user identification data (ID) field 710 and user data field 720. The user ID field 710 may contain an identifier that uniquely identifies the user. The user data field 720 may include one or more subfields. For example, the user data field 720 may include a link information field 722, a service provider information field 724, and possibly a permissions field 726.

The link information field 722 may contain links, such as a Uniform Resource Locators (URLs), to web sites maintained by service providers that may be used by the user. The service provider information field 724 may include information regarding different service providers that may be used by the user. The particular service providers included in the link information field 722 and/or the service provider information field 724 may be determined from one or more factors, such as the type of service they provide, the user's location, the user's preference, financial or business considerations, etc. The permissions field 726 may store information regarding permissible uses of document-related services by the user. For example, in a business environment, an employee may be unauthorized to use one or more of the services without permission from a supervisor.

In FIG. 7B, the database 750 may include multiple entries that contain a link information field 760 and a service provider information field 770. The link information field 760 may contain links, such as URLs, to web sites maintained by service providers. The service provider information field 770 may include information regarding different service providers. The service providers included in the link information field 760 and/or the service provider information field 770 may be provided based on one or more factors, such as location (e.g., city, state, country, etc.), type of service, and business considerations.

Exemplary Processing

Figure 8:
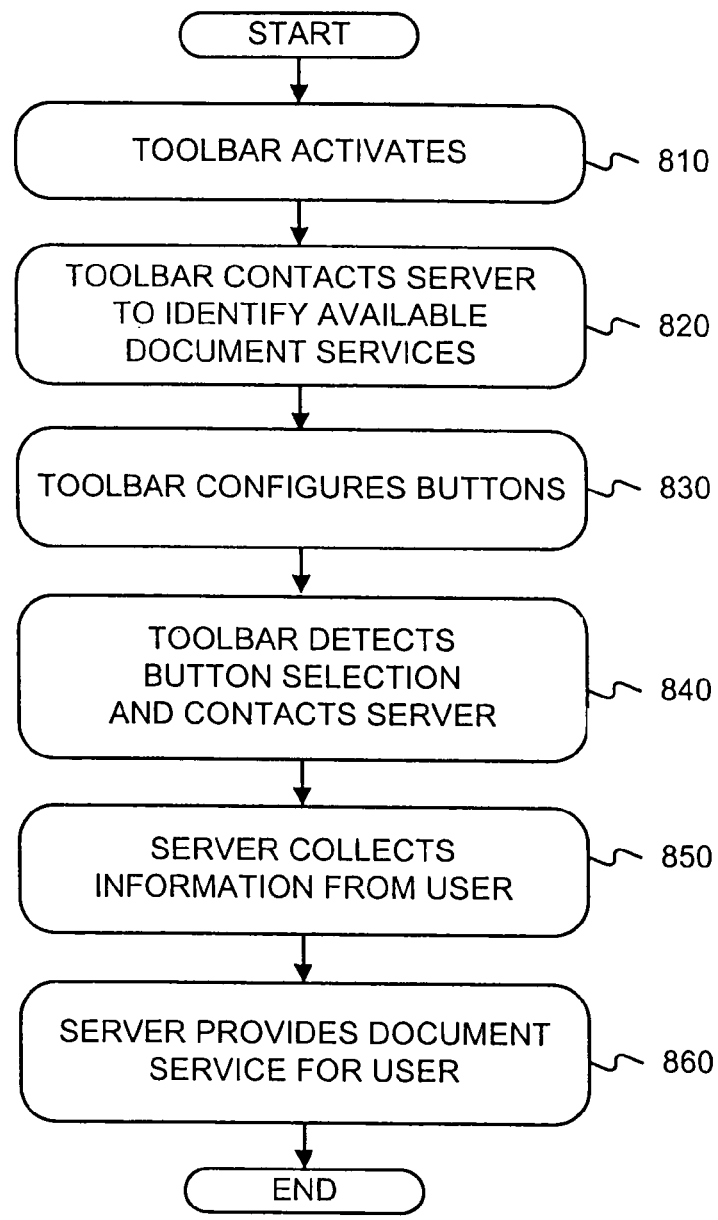
FIGS. 8-10 are flowcharts of exemplary processing for obtaining document-related services according to alternate implementations consistent with the present invention.
Figure 9:
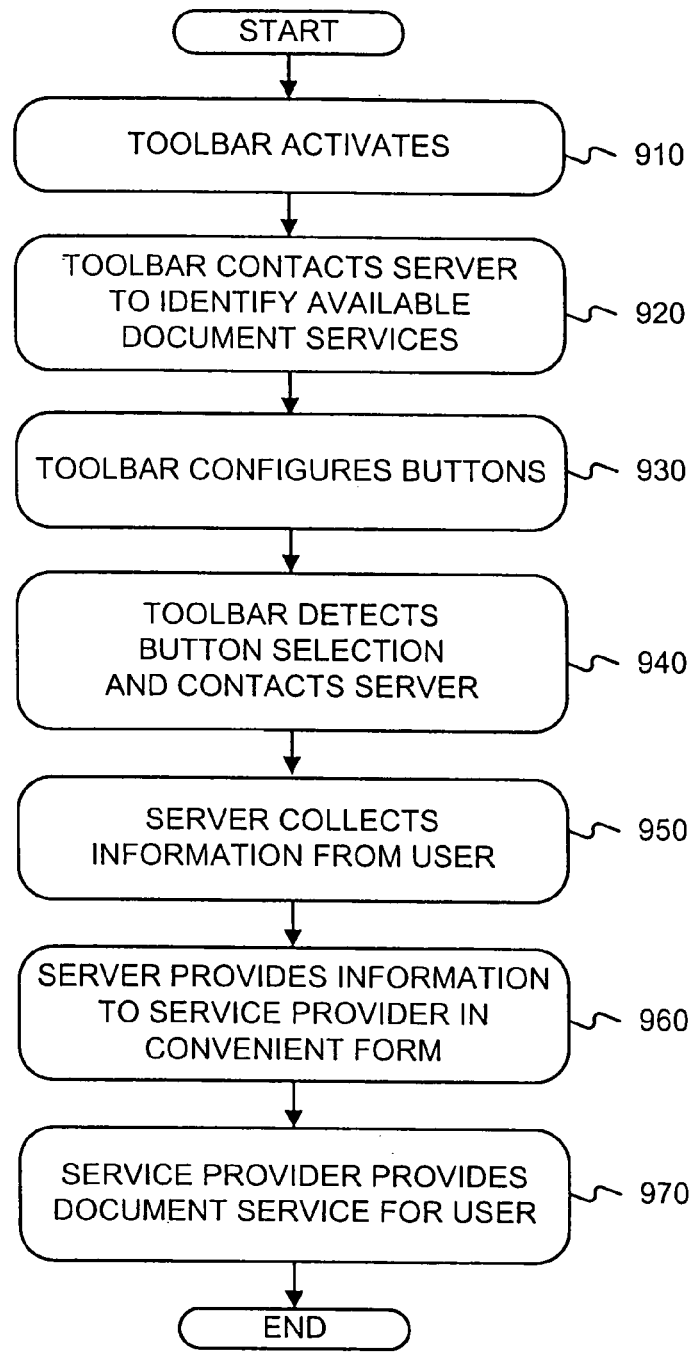
Figure 10:
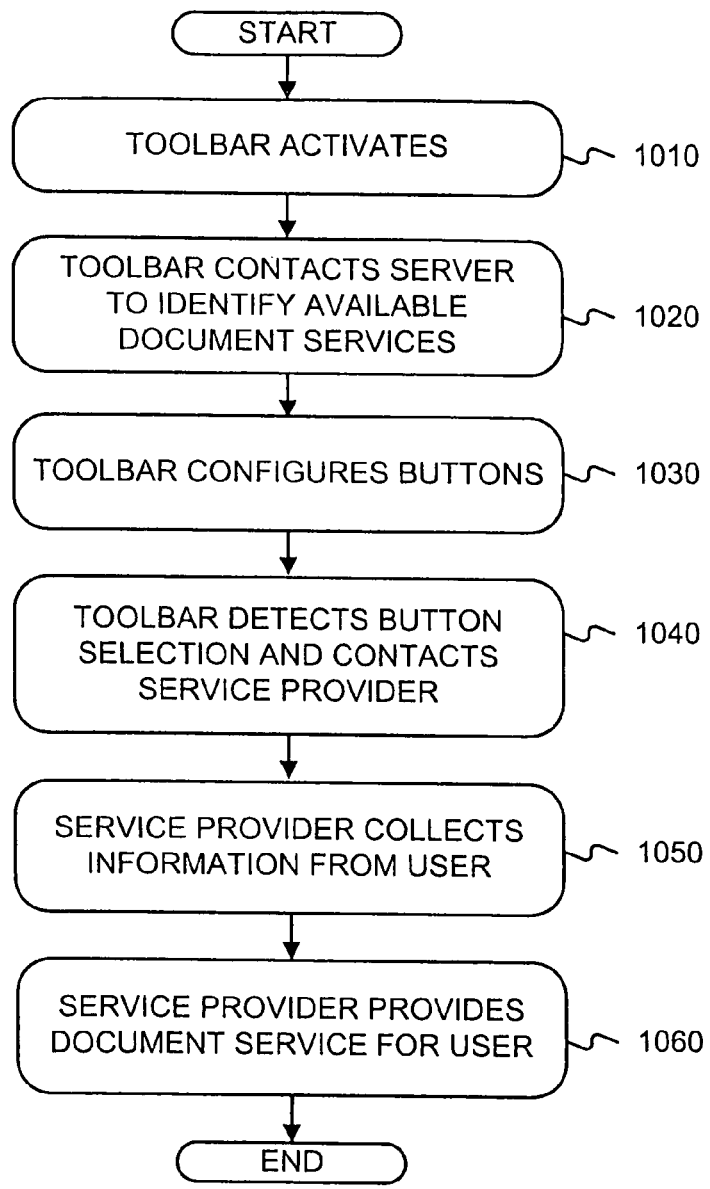

FIGS. 8-10 are flowcharts of exemplary processing for obtaining document-related services according to alternate implementations consistent with the present invention. Each of the flowcharts of FIGS. 8-10 describe different types of processing. The particular type of processing available to a user may depend upon one or more factors, such as the type of service requested or business considerations (e.g., one type of processing may be more feasible or cost-effective than another).

FIG. 8 is a flowchart of exemplary processing for obtaining document-related services according to a first implementation consistent with the present invention. In FIG. 8, processing may begin when a user initiates document preparation software 320 (FIG. 3) on the client 110 in a conventional manner. For example, the toolbar software 330 may activate upon initiation of the document preparation software 320 [act 810]. The toolbar software 330 may automatically activate or may activate when instructed by the user.

Once activated, the toolbar software 330 may present a graphical user interface, possibly in the form of the toolbar 400 (FIG. 4), to the user. Initially, the toolbar 400 may contain inactive (i.e., blank) or no software buttons. The toolbar 400 may then detect whether the client 110 has a network connection to the server 120. For example, if the client 110 and server 120 connect via the Internet, the toolbar 400 may detect whether the client 110 has an active Internet connection. If the connection exists, the toolbar 400 may contact the server 120 to identify the available document services [act 820].

The server 120 may provide the toolbar 400 with a list of available services and, possibly, the icons and links to use for the software buttons. For example, one or more of the following features may be dynamically configured for the toolbar 400: the software button appearance, the software button size, the number of software buttons presented, status information on the available services, and the code executed upon selecting the software buttons (e.g., the application service provider used, the information/forms gathered, and the available payment mechanisms). In response, the toolbar 400 may configure the software buttons to provide icons or some other type of information to identify the available document services [act 830].

At some point, the user may desire to initiate one of the document services. In this case, the user may select one of the software buttons on the toolbar 400. The user may make the selection in any conventional manner, such as by clicking on the software button using a mouse. The toolbar 400 detects the button selection and contacts the server 120 [act 840]. The toolbar 400 may identify, to the server 120, the type of service selected by the user (based on the selected button).

The server 120 may then interact with the user to collect the information necessary to provide the requested document service [act 850]. For example, the document the user is currently viewing via the graphical user interface of the document preparation software 320 may be automatically, securely, and electronically provided to the server 120. To maintain formatting, the document may be converted to a Portable Document Format (PDF), using Adobe Acrobat software. The server 120 may also obtain delivery information and instructions via a convenient form provided to the user. The form may be provided to the user via a window, such as a browser window or pop-up window. The server 120 may then provide the requested document service for the user [act 860].

FIG. 9 is a flowchart of exemplary processing for obtaining document-related services according to a second implementation consistent with the present invention. In FIG. 9, processing for acts 910-950 may correspond to processing for acts 810-850. Once the server 120 collects the information from the user, however, the server 120 may provide the information in a convenient form to the service provider 130 that will carry out the requested document service [act 960]. The server 120 may electronically provide the information to a secure location of the service provider 130. The service provider 130 may then provide the requested document service for the user [act 970].

FIG. 10 is a flowchart of exemplary processing for obtaining document-related services according to a third implementation consistent with the present invention. In FIG. 10, processing may begin when a user initiates document preparation software 320 on the client 110 in a conventional manner. For example, the toolbar software 330 may activate upon initiation of the document preparation software 320 [act 1010]. The toolbar software 330 may automatically activate or may activate when instructed by the user.

Once activated, the toolbar software 330 may present a graphical user interface, possibly in the form of the toolbar 400, to the user. Initially, the toolbar 400 may contain inactive (i.e., blank) or no software buttons. The toolbar 400 may then detect whether the client 110 has a network connection to the server 120. For example, if the client 110 and server 120 connect via the Internet, the toolbar 400 may detect whether the client 110 has an active Internet connection. If the connection exists, the toolbar 400 may contact the server 120 to identify the available document services [act 1020]. The server 120 may provide the toolbar 400 with a list of available services and, possibly, the icons and links to use for the software buttons. In this case, the links may contain links directly to the service providers 130 that offer the document services.

In response, the toolbar 400 may configure the software buttons to provide icons or some other type of information to identify the available document services [act 1030]. At some point, the user may desire to initiate one of the document services. In this case, the user may select one of the software buttons on the toolbar 400. The user may make the selection in any conventional manner, such as by clicking on the software button using a mouse. The toolbar 400 detects the button selection and contacts the service provider 130 to provide the requested service [act 1040].

The service provider 130 may then interact with the user to collect the information necessary to provide the requested document service [act 1050]. For example, the document the user is currently viewing via the graphical user interface of the document preparation software 320 may be automatically, securely, and electronically provided to the service provider 130. To maintain formatting, the document may be converted to a Portable Document Format (PDF), using Adobe Acrobat software. The service provider 130 may also obtain delivery information and instructions via a convenient form or graphical user interface provided to the user. The form may be provided to the user via a window, such as a browser window or pop-up window. The service provider 130 may then provide the requested document service for the user [act 1060].

In any of these cases, at each stage of performance of the requested document service, the user may be provided with status information. For example, the server 120 or service provider 130 may collect the status information and "push" the information to the client 110. The status information may include the time/date that the document was received, printed, copied, delivered, translated, etc.

Figure 11:
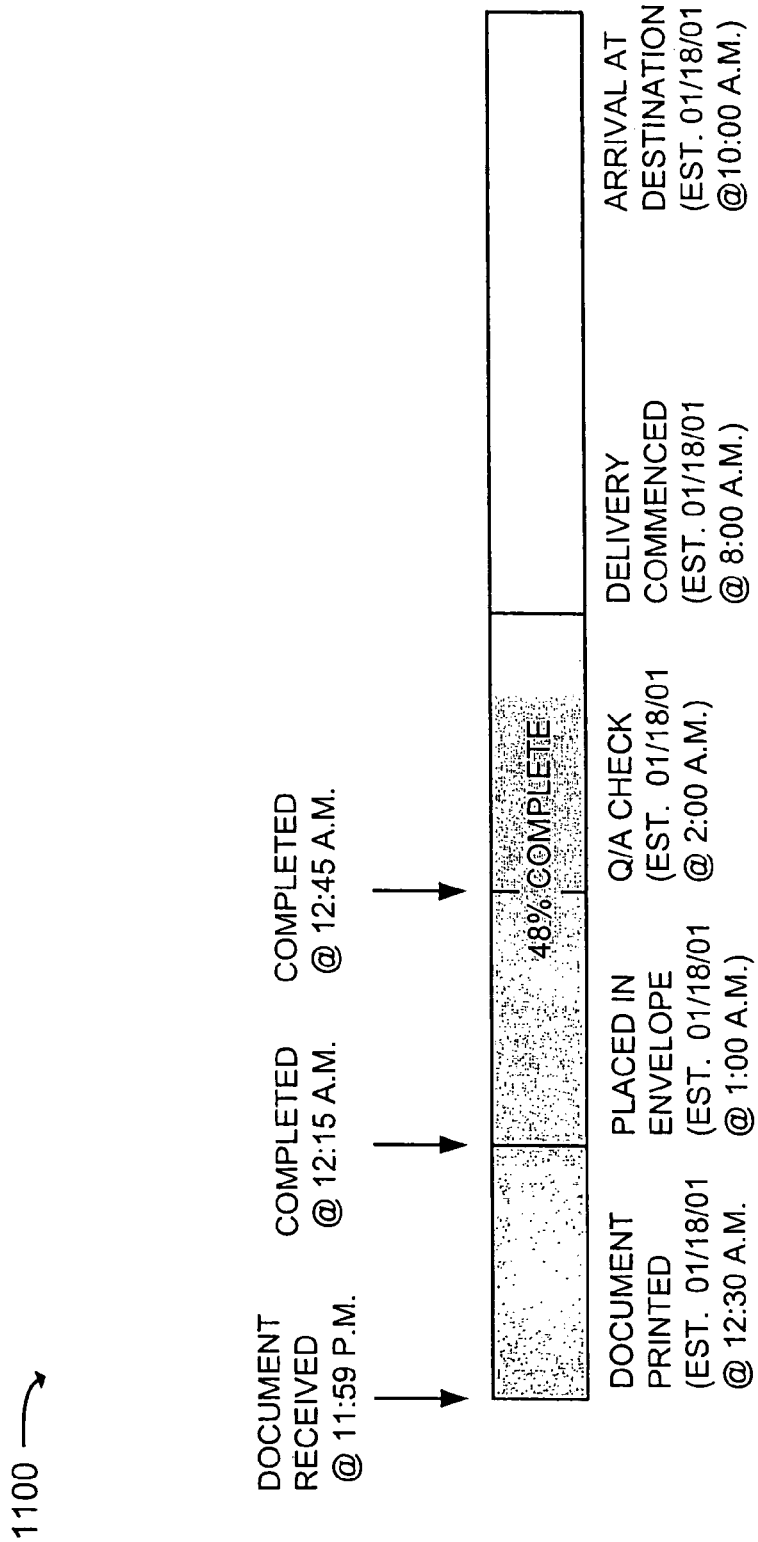
FIG. 11 is an exemplary diagram of a progress meter that may be presented to the user with regard to a document delivery service.

FIG. 11 is an exemplary diagram of a progress meter 1100 that may be presented to the user with regard to a document delivery service. The progress meter 1100 may be presented to the user in a number of different way, such as via a pop-up window, drop-down display, or as an icon or display within the toolbar 400. The progress meter 1100 may indicate the times and/or dates that certain tasks are completed, identify the tasks yet to be performed, and possibly estimate completion times and/or dates for the unperformed tasks.

The server 120 may also consolidate the fees incurred for various document-related services requested by the user and provide a periodic (e.g., monthly) bill to the user. The bill may itemize the various services to aid the user in identifying the costs.

CONCLUSION

Systems and methods consistent with the present invention provide an interactive graphical user interface, possibly in the form of a toolbar, that operates in conjunction with a document preparation application to present various document-related services directly from the graphical user interface of the document preparation software application.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, the toolbar has been described as a dynamic toolbar that interacts with a server to identify the document services that may be offered. In other implementations consistent with the present invention, the toolbar may be static. In this case, when the toolbar activates, the toolbar may present a predetermined set of software buttons that correspond to a predetermined set of document services. The toolbar may then buffer operations until such time as it detects a network connection. When a network connection is detected, the toolbar may synchronize with the server and/or service provider to carry out the buffered operations and obtain one or more of the document services.

Also, certain document services have been associated with the client 100, others with the server 120, and yet others with the service provider(s) 130. It should be understood that any of these document services may be performed by any of the entities.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. An automated method for providing one or more document services for a document, comprising:
   receiving, by a computing device from a server, an indication that a document service is available and an indication of a status of the available document service;
   activating a toolbar within a document preparation software application running on the computing device such that the toolbar and the document are visible at the same time;
   configuring the toolbar by activating a selectable icon corresponding to the available document service in the toolbar and displaying the status of the available document service in the toolbar;
   detecting selection of the selectable icon corresponding to the available document service; and
   providing the document from the computing device to one or more service providers for performance of the available document service by the one or more service providers, wherein the one or more service providers are located remotely from the computing device.

2. The method of claim 1, wherein the available document service is at least one of the following services: insertion of a user's electronic signature into a document, encrypted electronic transmission of a document, off-site electronic storage and retrieval of a document, maintaining the user's business and personal contacts for the purpose of facilitating document delivery, delivery of a document via an overnight courier service, initiation of U.S. Post Office mail delivery for a document, same day in-person messenger delivery of a document, filing a document with a governmental office, and transmission of a facsimile.

3. The method of claim 1, wherein the document is created using the document preparation software application.

4. The method of claim 1, further comprising:
   receiving, from the server, the selectable icon corresponding to the available document service before configuring the toolbar by activating the selectable icon.

5. The method of claim 1, further comprising:
receiving, from the server, an indication of a size and appearance of the selectable icon corresponding to the available document service;
wherein configuring the toolbar comprises displaying the activated selectable icon according to the indication of the size and appearance of the selectable icon.

6. The method of claim 1, further comprising:
receiving, from the server, code to be executed upon selection of the selectable icon; and
executing the received code in response to detecting selection of the selectable icon.

7. An apparatus for providing one or more document services for a document, the apparatus comprising:
a first communication mechanism configured to receive, at the apparatus from a server, an indication that a document service is available and an indication of a status of the available document service;
a processor configured to:
activate a toolbar within a document preparation software application running on the apparatus such that the toolbar and the document are visible at the same time, and
configure the toolbar with a selectable icon corresponding to the available document service;
a detector configured to detect selection of the selectable icon corresponding to the available document service; and
a second communication mechanism configured to provide the document from the apparatus to one or more service providers for performance of the available document service by the one or more service providers, wherein the one or more service providers are located remotely from the apparatus.

8. The apparatus of claim 7, wherein the available document service is at least one of the following services: insertion of a user's electronic signature into a document, encrypted electronic transmission of a document, off-site electronic storage and retrieval of a document, maintaining the user's business and personal contacts for the purpose of facilitating document delivery, delivery of a document via an overnight courier service, initiation of U.S. Post Office mail delivery for a document, same day in-person messenger delivery of a document, filing a document with a governmental office, and transmission of a facsimile.

9. The apparatus of claim 7, wherein the document is created using the document preparation software application.

10. The apparatus of claim 7, wherein the first communication mechanism is configured to receive, from the server, the selectable icon corresponding to the available document service.

11. The apparatus of claim 7, wherein the first communication mechanism is configured to receive, from the server, an indication of a size and appearance of the selectable icon corresponding to the available document service, and wherein the processor is further configured to configure the toolbar by displaying the selectable icon according to the indication of the size and appearance of the selectable icon.

12. The apparatus of claim 7, wherein the first communication mechanism is configured to receive, from the server, code to be executed upon selection of the selectable icon, and wherein the processor is further configured to execute the received code in response to detecting selection of the selectable icon.

13. A system for providing one or more document services for a document, the system comprising:
means for receiving, at the system from a server, an indication that a document service is available and an indication of a status of the available document service;
means for activating a toolbar within a document preparation software application running on the system such that the toolbar and the document are visible at the same time;
means for configuring the toolbar by activating a selectable icon corresponding to the available document service in the toolbar and displaying the status of the available document service in the toolbar;
means for detecting selection of the selectable icon corresponding to the available document service; and
means for providing the document from the system to one or more service providers for performance of the available document service by the one or more service providers, wherein the one or more service providers are located remotely from the system.

14. The system of claim 13, wherein the available document service is at least one of the following services: insertion of a user's electronic signature into a document, encrypted electronic transmission of a document, off-site electronic storage and retrieval of a document, maintaining the user's business and personal contacts for the purpose of facilitating document delivery, delivery of a document via an overnight courier service, initiation of U.S. Post Office mail delivery for a document, same day in-person messenger delivery of a document, filing a document with a governmental office, and transmission of a facsimile.

15. The system of claim 13, wherein the document is created using the document preparation software application.

16. The system of claim 13, wherein the means for receiving is a means for receiving, from the server, the selectable icon corresponding to the available document service.

17. The system of claim 13, wherein the means for receiving is a means for receiving, from the server, an indication of a size and appearance of the selectable icon corresponding to the available document service, and wherein the means for configuring is a means for configuring the toolbar by displaying the activated selectable icon according to the indication of the size and appearance of the selectable icon.

18. The system of claim 13, wherein the means for receiving is a means for receiving, from the server, code to be executed upon selection of the selectable icon, the system further comprising:
means for executing the received code in response to detecting selection of the selectable icon.

19. A computer readable storage device, comprising instructions for providing one or more document services for a document, the instructions comprising:
instructions to receive, by a computing device from a server, an indication that a document service is available and an indication of a status of the available document service;
instructions to activate a toolbar within a document preparation software application running on the computing device such that the toolbar and the document are visible at the same time;
instructions to configure the toolbar by activating a selectable icon corresponding to the available document service in the toolbar and displaying the status of the available document service in the toolbar;
instructions to detect selection of the selectable icon corresponding to the available document service; and
instructions to provide the document from the computing device to one or more service providers for performance of the available document service by the one or more service providers, wherein the one or more service providers are located remotely from the computing device.

20. The computer readable storage device of claim 19, wherein the available document service is at least one of the following services: insertion of a user's electronic signature into a document, encrypted electronic transmission of a document, off-site electronic storage and retrieval of a document, maintaining the user's business and personal contacts for the purpose of facilitating document delivery, delivery of a document via an overnight courier service, initiation of U.S. Post Office mail delivery for a document, same day in-person messenger delivery of a document, filing a document with a governmental office, and transmission of a facsimile.

21. The computer readable storage device of claim 19, wherein the document is created using the document preparation software application.

22. The computer readable storage device of claim 19, the instructions further comprising:
   instructions to receive, from the server, the selectable icon corresponding to the available document service before configuring the toolbar by activating the selectable icon.

23. The computer readable storage device of claim 19, the instructions further comprising:
   instructions to receive, from the server, an indication of a size and appearance of the selectable icon corresponding to the available document service;
   wherein instructions to configure the toolbar comprise instructions to configure the toolbar by displaying the activated selectable icon according to the indication of the size and appearance of the selectable icon.

24. The computer readable storage device of claim 19, the instructions further comprising:
   instructions to receive, from the server, code to be executed upon selection of the selectable icon; and
   instructions to execute the received code in response to detecting selection of the selectable icon.

* * * * *